Aug. 2, 1955
H. C. STRATTON
2,714,271
POWER DRIVEN FISHING REEL
Filed Sept. 5, 1951
3 Sheets-Sheet 1
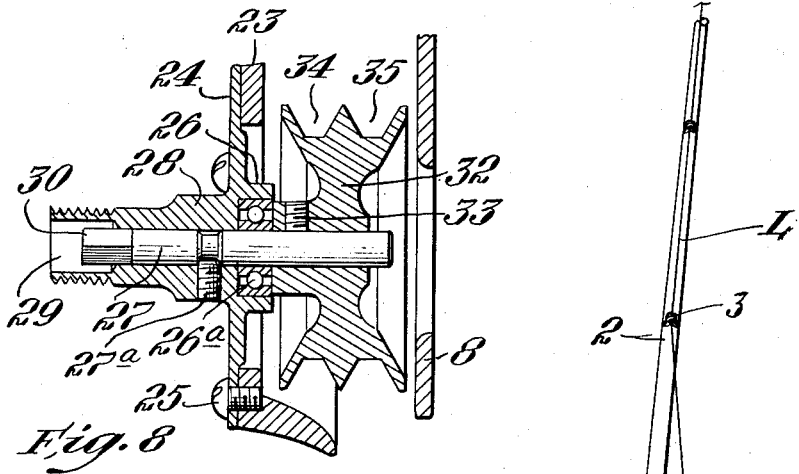
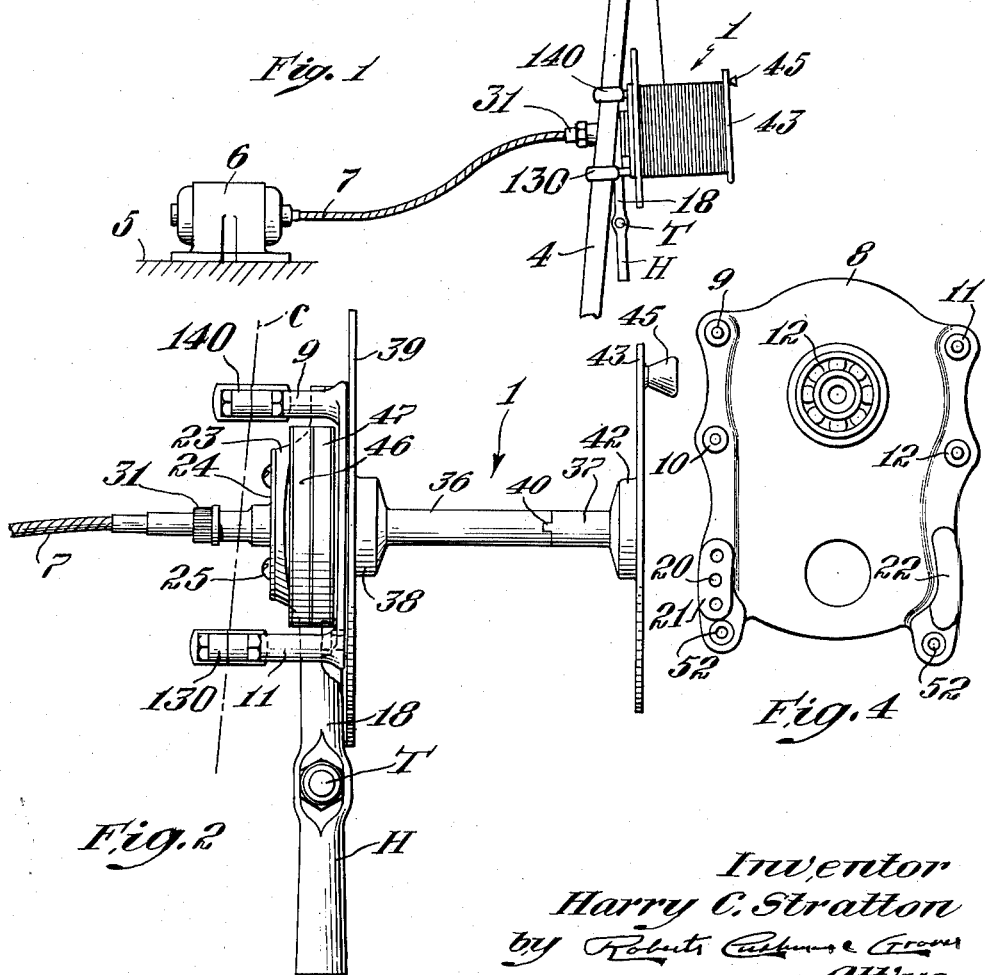
Inventor
Harry C. Stratton
by Roberts Cushman & Grove
att'ys.

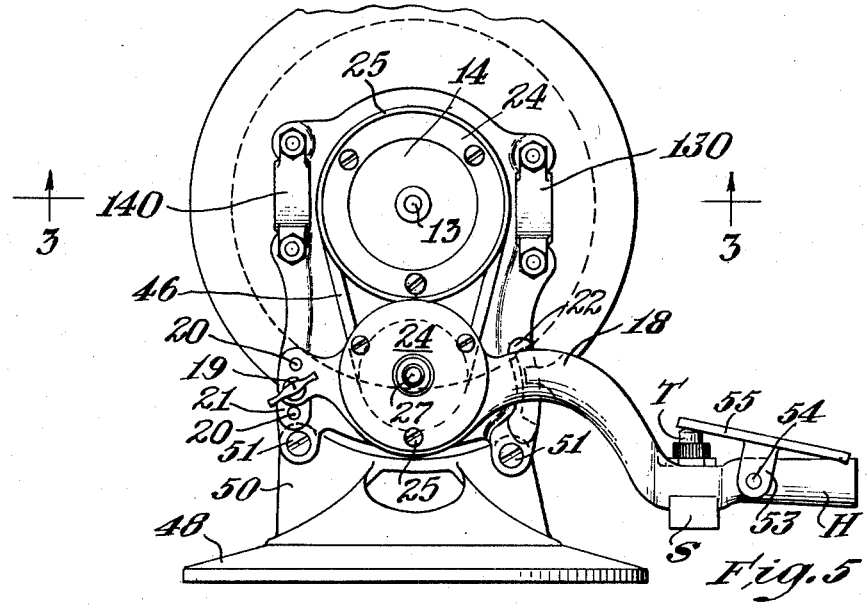
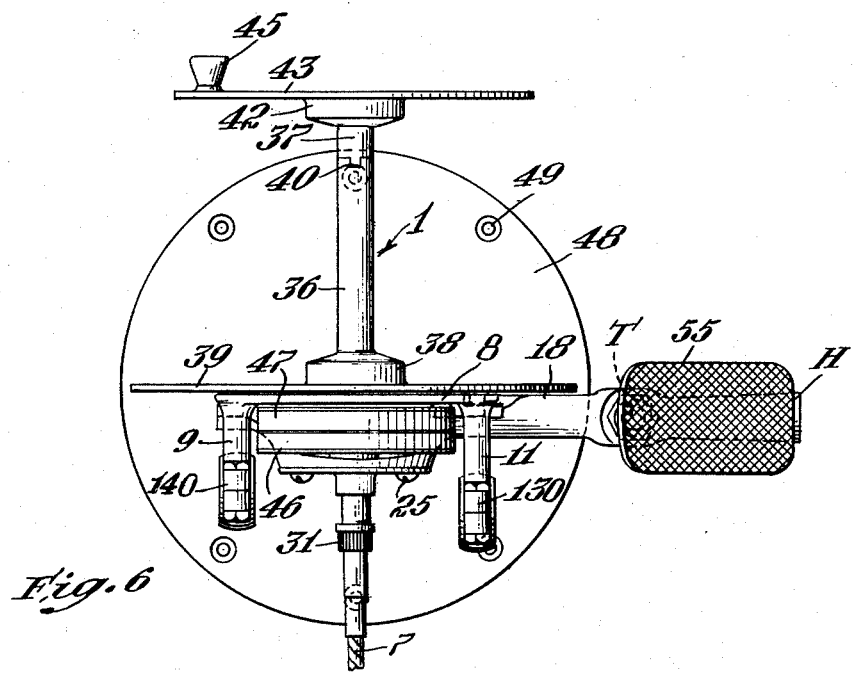
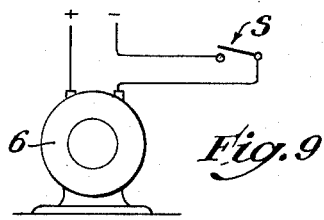

Aug. 2, 1955  H. C. STRATTON  2,714,271
POWER DRIVEN FISHING REEL
Filed Sept. 5, 1951  3 Sheets-Sheet 3

Inventor
Harry C. Stratton
by Roberts Cushman & Grover
Att'ys.

United States Patent Office 2,714,271
Patented Aug. 2, 1955

2,714,271

POWER DRIVEN FISHING REEL

Harry C. Stratton, West Southport, Maine

Application September 5, 1951, Serial No. 245,117

7 Claims. (Cl. 43—21)

This invention pertains to fishing reels, particularly to power-driven reels, and, although of general utility, is of especial value in deep sea fishing where great lengths of line are employed in angling for big and gamy fish, for example, tuna. It has heretofore been proposed to drive a fishing reel, for example, for winding in the line, by means of an electric motor forming a part of the reel structure or mounted upon the fishing rod, but such prior arrangements are impractical because they fail to furnish the requisite amount of power for playing a big fish, or are of undue weight, if the motor and batteries are mounted upon the rod and must be supported by the hands of the fisherman.

At the present time most fishing boats employed in deep sea fishing are or may readily be provided with current-generating dynamos capable of supplying a motor of adequate power to turn the largest fishing reel. The present invention is based upon this possibility of obtaining power from a motor mounted, for example, on the boat's deck, adequate to drive a reel of the largest size and for playing the largest and most gamy fish. The present invention, therefore, contemplates the provision of a fishing reel designed to be mounted, if desired, upon the customary freely movable rod, and with provision for driving it by power received from a motor mounted on a fixed support, independent of the rod, and receiving its current from a dynamo or storage battery of large capacity. The invention, as herein disclosed, provides a reel of very simple construction having a minimum number of parts commensurate with the attainment of its desired operation and which, as compared with most previous reels of large capacity, is very cheap and easy to manufacture. An object of the present invention is to provide a power-driven reel which may be mounted on a fishing rod in substantially the same way as the usual hand-driven reel and without impairing the freedom of motion of the rod by the fisherman, but with means for supplying reel-driving power from a stationary motor of adequate size. A further object is to provide a power-driven reel, receiving its driving force from a motor mounted on a stationary part, and with means easily actuable by the hand which holds the rod for starting and stopping the motor. A further object is to provide a power-driven reel receiving its driving power from a motor mounted on a fixed support and having means easily actuable by the hand of the fisherman for applying braking force to the reel. A further object is to provide a power-driven reel having ample capacity for holding great lengths of line, for example, as much as 2000 feet, in which the reel shaft is mounted to turn very freely, and with speed-reducing means, including a belt and pulleys, for driving the reel at the proper speed. A further object is to provide a power-driven reel having provision for mounting it upon a hand-supported rod, or, alternatively, upon a base designed to be secured to a boat's deck. A further object is to provide a power-driven reel having provision for so associating it with a fishing rod that the line from the rod tip tends to wind up upon the reel approximately midway between the heads of the reel drum. Other and further objects and advantages of the invention will be pointed out in the following more detailed description and by reference to the accompanying drawings wherein Fig. 1 is a fragmentary, diagrammatic elevational view drawn to a small scale, illustrating the reel of the present invention mounted upon a fishing rod (the ends of the latter being broken off) and arranged to be driven by a motor mounted on a fixed support;

Fig. 2 is a plan view of the reel drawn to a larger scale than Fig. 1;

Fig. 4 is a left-hand side elevational view of the reel frame, drawn to a smaller scale than Fig. 3, showing one of the shaft bearings but with other parts omitted;

Fig. 5 is a side elevational view, drawn to smaller scale than Fig. 2, showing the reel of the present invention mounted upon a stand which may be bolted to a boat's deck or other suitable support;

Fig. 6 is a plan view of the assembly shown in Fig. 5;

Fig. 8 is a fragmentary sectional view, in the same plane as Fig. 3, showing details of the drive pulley and its support, and Fig. 9 is a wiring diagram.

Figure 3:
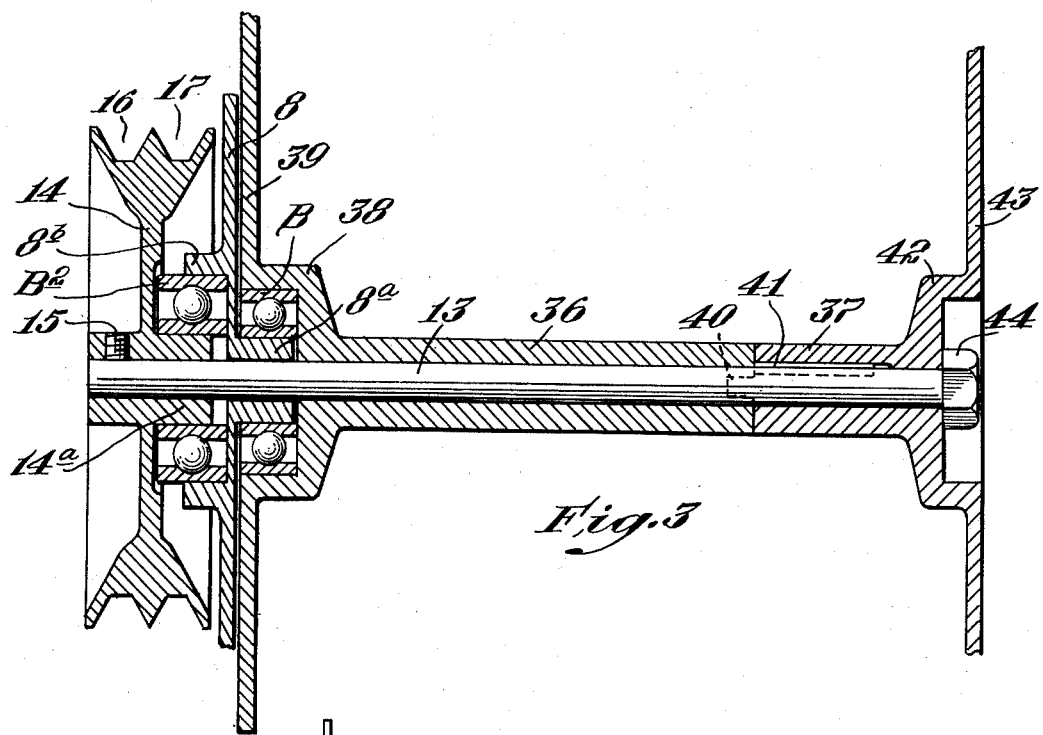
Fig. 3 is a fragmentary, vertical sectional view, drawn to a larger scale, taken on the axis of the reel shaft.

Referring to the drawings, the numeral 1 designates the improved reel of the present invention, the reel being shown as mounted on a fishing rod 2 having the handle 4 and spaced line guides, the lowermost of which is indicated by the numeral 3. As illustrated in Fig. 1, the rod is freely movable, being supported by the hands of the fisherman, it being understood that the lower end of the rod may rest in a socket arranged, for example, at the front of the chair in which the fisherman is seated. The numeral 5 designates a relatively fixed support, for example, the deck of a fishing boat, having mounted thereon an electric motor 6 supplied with current from any suitable source, for instance, a dynamo or storage battery of suitable capacity. A flexible shaft 7 is connected at one end to the motor shaft, and is provided at the opposite end, as hereafter described, with a coupling for detachably connecting it to the mechanism of the reel.

The reel, as here illustrated, comprises a rigid frame 8 (Fig. 4) preferably of some light metal, such as aluminum or possibly of suitable plastic material, having projecting from its left-hand face pairs of posts 9, 10, 11, 12, respectively. To the outer ends of these posts, split rings 130 and 140 are secured, these rings being designed to embrace the handle portion 4 of the fishing rod, and being so designed that they may be tightened about the handle so as to clamp the reel firmly to the rod. As illustrated most clearly in Figs. 2 and 6, the posts 11 and 12 are longer than the posts 9 and 10 for a purpose hereafter described. At its right-hand side (Fig. 3) the frame 8 is provided with an integral, tubular boss 8ª on which is mounted an anti-friction bearing B. At the left-hand side the frame 8 is provided with a second integral boss 8ᵇ, coaxial with the boss 8ª, and within which is arranged an anti-friction bearing B². The reel shaft 13 is arranged with its left-hand end portion passing freely through the tubular boss 8ª and projecting to the left beyond the bearing B². To this left-hand end of the shaft 13 there is fixed a pulley 14 which is secured to the shaft by the set screw 15. Preferably, as illustrated, this pulley has two V-grooves 16 and 17 in its periphery, and has an elongate hub portion 14ª which fits within the inner ring of the anti-friction bearing B².

A lever 18 (Figs. 2 and 5) is fulcrumed upon a thumb screw 19 designed to have selective engagement with any one of a plurality of vertically spaced, screw-threaded openings 20 (Fig. 4) in a pad 21 formed on the outer surface of the left-hand lower part of frame member 8, as seen in Fig. 4. This lever extends across the frame 8 from front to rear, and is provided with an ear at its inner side having a slot which receives a thin guide element 22 (Fig. 4) at the rear edge of the frame 8 near its bottom. This guide element and slot prevent sidewise movement of the lever 18 as it rocks in a vertical plane about the horizontal axis of the thumb screw 19. This lever 18 has an annular portion 23 (Fig. 8) whose center is directly below the axis of the shaft 13. A plate 24 is secured to the outer side of this annular portion 23 by screws 25, and is provided at its inner side with a hub 26 (Fig. 8) within which is arranged an anti-friction bearing 26ᵃ. A short shaft 27 is arranged to turn in the bearing 26ᵃ. To the inner end of this shaft a pulley 32 is secured by the set screw 33, this pulley being interposed between the annular portion 23 of the lever 18 and the frame 8. This pulley 32, like the pulley 14, is provided with two V-grooves 34 and 35 in its periphery, but is of a smaller effective diameter than the pulley 14. The shaft 27 projects outwardly beyond the plate 24 and into a hollow boss 28 formed integrally with the plate 24. The shaft 27 has a circumferential groove which receives the inner end of a set screw 27ᵃ which prevents endwise movement of the shaft but permits rotation of the same. The boss 28 has a bore in its outer end, as shown at 29, of a diameter greater than that of the shaft 27. The outer end of the shaft 27 is squared, as shown at 30 in Fig. 8, and is designed to receive a socket (not shown) at the end of the flexible shaft 7. The flexible shaft is provided with a coupling 31 which is designed to engage screw threads on the exterior of the boss 28, thereby detachably to couple the flexible shaft to the shaft 27.

The reel drum (Fig. 3) comprises a tubular barrel portion consisting of the coaxial parts 36 and 37 which are mounted on the reel shaft 13. The part 36 has an enlargement at its left-hand end, as shown in Fig. 3, providing a cylindrical chamber in which fits the outer ring of the bearing B. The left-hand head 39 of the reel drum is integral with the part 38. The opposed ends of the barrel members 36 and 37 are provided with interlocking tongue and slots, as indicated at 40, and at least one of the members 36 or 37 is secured to the shaft 13 so as to turn with the latter by a key 41. The part 37 of the reel barrel is provided with an enlargement 42 at its right-hand end which is integral with the reel head 43, the parts 36 and 37 being held in assembled relation by a nut 44 engaging the screw-threaded right-hand end of the shaft 13. Preferably, the reel head 43 is provided with a knob 45 (Figs. 1 and 6) for use in manually turning the reel drum.

Motion is transmitted from the pulley 32 to the pulley 14 by a pair of V belts 46 and 47 (Figs. 2, 5 and 6). As here illustrated, it is preferred to employ double pulleys with two belts in order to insure the desired driving traction (the distance between the pulley axes being small), but it is contemplated that, if desired, a single pulley, that is to say, a pulley having a single groove and a single belt, may be employed. Since the pulley 32 is of smaller diameter than pulley 14, a reduction in speed, as between shafts 27 and 13, is provided. The rear end of the lever 18 is provided with a handle H (Fig. 2), and forwardly of this handle a switch S (Figs. 5 and 7) is mounted on the lever 18, the circuit closing button T of this switch being so arranged as readily to be depressed by the thumb of the fisherman while grasping the handle H with one hand.

In the use of the device as thus far described, and assuming that the reel is clamped to the handle 4 of the fishing rod which is held in the fisherman's hands with its butt stepped in a suitable socket, and that the fisherman desires to wind in the line, he will press down the button T, thus energizing the motor circuit and causing the flexible shaft 7 to transmit motion from the motor to the shaft 27. The weight of the lever 18 and the parts mounted thereon is sufficient to tension the belts 46 and 47 enough to insure normal driving of the reel shaft 13 which is rapidly turned to wind in the line. As above noted, the rings 130 and 140 which clamp the rod to the reel are disposed at different distances from the frame 8, the parts being so arranged that the lowermost line guide 3 (Fig. 1) of the rod is in a vertical plane transverse to the reel axis substantially midway between the heads of the drum. Thus, when the drum begins to turn, the line is drawn from the guide 3 of the rod and tends to wind upon the reel drum approximately midway between the heads. As soon as the pressure is removed from the button T, the power drive ceases. If at the same time the user lift up on the handle H, the tension on the drive belts may be so decreased as to permit the reel to unwind freely. If, when the motor is stopped, the lever 18 be pushed downwardly with substantial force, the grip of the belts 46 and 47 on the now stationary pulley 32 is so increased that they act as a very positive brake so as actually to stop rotation of the reel drum. By moving the lever 18 up or down, variations in the degree of retarding or braking force may be produced at the will of the fisherman and as may be necessary in playing the fish. Thus, by manipulation of the switch button and the handle H it is possible to wind the reel drum rapidly or to free it for letting out the line, or to provide any desired degree of retarding or braking action.

Since the reel and rod are of substantial weight, no matter how light the material may be of which they are constructed, and because large and gamy fish place a great strain upon the fisherman, it is contemplated, as within the scope of the present invention, to mount the reel and rod upon a stationary stand which may, for example, be secured to the deck of the fishing boat. Such a stand is indicated at 48 (Figs. 5 and 6), this stand being a casting, preferably of aluminum or similar very light material, and having an upwardly directed fin or rib 50 to which the frame 8 of the reel is detachably connected by screws 51 (Fig. 5) which pass through opening 52 (Fig. 4) in downwardly directed ears formed for this purpose at the lower part of the frame 8. The stand 48 may be provided with holes 49 (Fig. 6) at desired points for the reception of screws or bolts by means of which it is fixed to the deck of the fishing boat or other appropriate support. When the reel is mounted upon such a stand, designed to be secured to the deck of the boat, it is preferred to bend the lever 18 so that its rear end portion is near the deck. A treadle member, having a part 53 which is pivoted to the lever 18 at the point 54, comprises the foot-actuated part 55 whose forward portion overlaps the button T of the switch. With this arrangement, pressure of the foot upon the forward end of the treadle member 55 will close the motor circuit to start the motor, at the same time tensioning the belts, and thus wind up the line. On the other hand, by foot pressure upon the rear part of the treadle 55 the button T is released and the motor stopped, while at the same time the lever 18 is moved downwardly, thus tensioning the belts. Since the motor is now stopped, a very powerful retarding or braking action is created.

Figure 7:
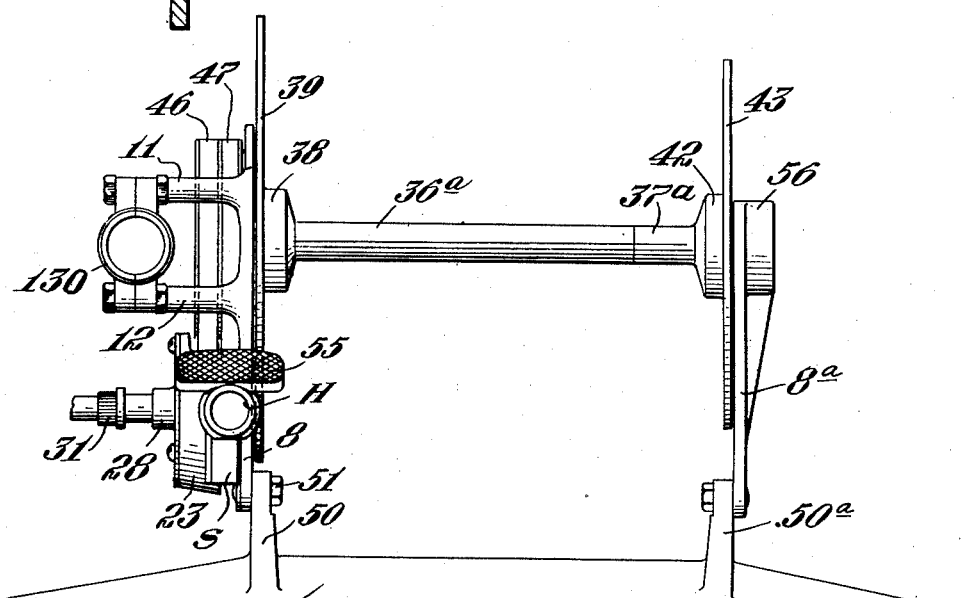
Fig. 7 is a fragmentary, front elevational view showing a modification particularly designed for commercial fishing.

For commercial fishing, it may be desirable to provide a reel drum of unusual capacity. As illustrated in Fig. 7, the barrel members 36ᵃ and 37ᵃ of the reel are so dimensioned as to space the heads 39 and 43 further apart than would be necessary for use in ordinary fishing for sport. With this arrangement, the reel shaft may be so long that it is no longer practical to support it in bearings at one end portion only, and with this in view the stand 48ᵃ, on which the reel is mounted, is provided with a second upstanding fin 50ᵃ to which a secondary frame member 8ᵃ is secured. This secondary frame member is provided with a housing 56 for an anti-friction bearing (not shown)

in which the right-hand end of the reel shaft turns. Thus, the reel shaft is supported at points adjacent to each of the reel drum heads and is thus capable of withstanding any strain which may be imposed upon it in the winding up of the line, even though it may be of a capacity to take several thousand feet of line.

Obviously the reel may be made in a range of sizes, corresponding to the type of fishing for which it will be used. Moreover, it is contemplated that such portions of the mechanism as might be injured by salt water, will be of a corrosion resistant material, for example, anodized aluminum, and that any of the operative mechanisms may be suitably encased to protect it from injury.

While certain desirable embodiments of the invention have herein been illustrated by way of example, it is to be understood that the invention is broadly inclusive of any and all embodiments falling within the scope of the appended claims.

I claim:

1. A fishing reel comprising a rigid frame, axially spaced anti-friction bearings carried by the frame and a horizontal shaft having one end portion arranged to turn in said bearings, a reel drum fixed to the shaft at one side of the frame, a drive pulley fixed to the shaft at the opposite side of the frame, a lever pivoted to the frame to rock about an axis parallel to that of the reel shaft, a second pulley which is mounted upon the lever, a belt embracing said pulleys, the lever being so arranged that its weight tends to tension the belt, a flexible shaft for conveying driving power from a stationary motor to the second pulley, and rod-holding means fixed to the frame.

2. A fishing reel comprising a rigid frame, axially spaced anti-friction bearings carried by the frame and a horizontal shaft having one end portion arranged to turn in said bearings, a reel drum fixed to the shaft at one side of the frame, a drive pulley fixed to the shaft at the opposite side of the frame, a lever pivoted to the frame to rock about an axis parallel to that of the reel shaft, a second pulley which is mounted upon the lever, a belt embracing said pulleys, the lever being so arranged that its weight tends to tension the belt, a stationary electric motor, a flexible shaft for conveying driving power from said motor to the second pulley, rod holding means fixed to the frame, and a switch mounted upon said lever which controls the supply of current to the motor.

3. A fishing reel according to claim 2 wherein the frame is mounted on a rigid stand designed to be secured to a boat's deck.

4. A fishing reel according to claim 2 wherein the frame is mounted on a rigid stand designed to be secured to a boat's deck, and a foot pedal mounted on the lever for actuating the switch.

5. A fishing reel according to claim 2 wherein the lever is provided with a handle at its free end by means of which it may be lifted to decrease the belt tension.

6. A fishing reel according to claim 2 wherein the frame includes a rigid part provided with a bearing for supporting the opposite end portion of the reel shaft.

7. A fishing reel according to claim 2 wherein the frame has rings for attaching the reel to a rod provided with spaced apart conventional line guides, said attaching rings being located at such distances respectively from a plane perpendicular to the axis of the drum that the lowermost of said line guides, on the rod removably held by the rings, lies in a plane substantially midway between the planes of the heads of the drums.

References Cited in the file of this patent

UNITED STATES PATENTS

| | | |
|---|---|---|
| 318,707 | Dugan | May 26, 1885 |
| 425,955 | Peirce | Apr. 15, 1890 |
| 488,678 | Leprohon | Dec. 27, 1892 |
| 495,827 | Newell | Apr. 18, 1893 |
| 1,580,986 | Aberson | Apr. 13, 1926 |
| 1,737,707 | Dickson | Dec. 3, 1929 |
| 2,238,127 | Nissen | Apr. 15, 1941 |
| 2,262,637 | Fanshier | Nov. 11, 1941 |
| 2,286,092 | Hedlund et al. | June 9, 1942 |
| 2,518,159 | Martin | Aug. 8, 1950 |
| 2,541,876 | Lockwood | Feb. 13, 1951 |
| 2,582,289 | Smith | Jan. 15, 1952 |
| 2,585,313 | Hart | Feb. 12, 1952 |